Jan. 9, 1951     E. SEID ET AL     2,537,427
DIGITAL SERVO

Filed Sept. 19, 1949     7 Sheets-Sheet 1

INVENTORS
EUGENE SEID
LESTER L. KILPATRICK
BY William R. Lane
ATTORNEY

Jan. 9, 1951     E. SEID ET AL     2,537,427
DIGITAL SERVO

Filed Sept. 19, 1949     7 Sheets-Sheet 2

INVENTORS
EUGENE SEID
LESTER L. KILPATRICK

BY William R. Lane
ATTORNEY

Jan. 9, 1951 E. SEID ET AL 2,537,427
DIGITAL SERVO
Filed Sept. 19, 1949 7 Sheets-Sheet 3

INVENTORS
EUGENE SEID
LESTER L. KILPATRICK
BY William P. Lane
ATTORNEY

INVENTORS
EUGENE SEID
LESTER L. KILPATRICK
BY William R. Lane
ATTORNEY

Jan. 9, 1951   E. SEID ET AL   2,537,427
DIGITAL SERVO

Filed Sept. 19, 1949   7 Sheets-Sheet 7

INVENTORS
EUGENE SEID
LESTER L. KILPATRICK
BY William R Lane
ATTORNEY

Patented Jan. 9, 1951

2,537,427

UNITED STATES PATENT OFFICE 2,537,427

DIGITAL SERVO

Eugene Seid and Lester L. Kilpatrick, Los Angeles, Calif., assignors to North American Aviation, Inc.

Application September 19, 1949, Serial No. 116,482

21 Claims. (Cl. 318—28)

This invention pertains to an electrical servo system and particularly to a servo mechanism adapted to convert a whole number into a shaft rotation. In the past it has been conventional practice to construct servo systems around some variable quantity such as voltage, current or displacement not expressible in terms of a whole number. Precisely what is involved is the requirement of obtaining a certain voltage, current or displacement and of maintaining or predeterminately varying that quantity with time. The ordinary technique involves approximately measuring the voltage, current or displacement attained and then correcting whatever means is used for obtaining such voltage, current or displacement by an amount calculated to correct the first approximation thereof. By successive corrections spaced at intervals which depend upon the time lags of the system, the result is slaved or servoed to the required input.

However, no system has been devised which is capable of converting a whole number into a shaft rotation or displacement, which in turn can be measured in terms of whole numbers and compared or servoed, on the basis of a whole number, to the required whole number.

It is therefore an object of this invention to provide a servo system which is capable of converting digits into a shaft rotation.

It is a further object of this invention to provide a servo system capable of storing a digital input and producing an output exactly proportional to said input.

It is a further object of this invention to provide a servo mechanism capable of converting a shaft rotation into digital form for exact comparison with said digital input.

It is a further object of this invention to provide a servo mechanism adapted to convert positive or negative numbers into directional shaft rotations.

It is a further object of this invention to provide a servo mechanism capable of producing a shaft velocity proportional to a number of stored pulses, and of using the rotation of said shaft to reduce said number of stored pulses in order to make the total shaft rotation proportional to any number of input pulses.

It is a further object of this invention to produce a shaft velocity proportional to the number of input pulses per unit time.

It is a further object of this invention to control exactly the number of cycles from a variable frequency oscillator to conform with the number of cycles output from a standard oscillator.

It is a further object of this invention to control exactly the number of cycles from a variable frequency oscillator to be any whole number higher or lower than the number of cycles output from a standard oscillator.

Other objects of invention will become apparent from the following description taken in connection with the accompanying drawings in which.

Figure 1:
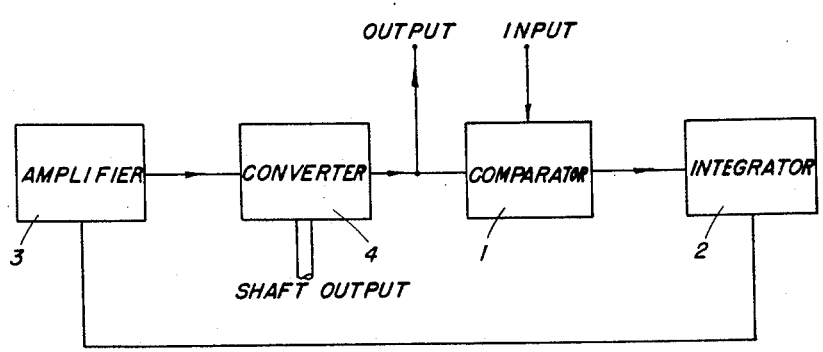
Fig. 1 is a generalized block diagram of the device.

Referring to Fig. 1, there is shown a generalized block diagram of the digital servo mechanism of this invention. In general, the device is designed to convert an input which consists of a number of electrical pulses into an output in terms of an exact displacement, either angular or linear, or a voltage or current value. A pulse input is fed to comparator 1 which also receives pulses from a source to be hereinafter discussed. The input to comparator 1 may be in the form of consecutive single pulses, or, where comparator 1 comprises a binary counter and parallel adder, said input may be introduced as a parallel binary number from one or more separate parallel binary counters. The output of comparator 1, which consists of the difference between its two inputs, is a voltage proportional to the difference between the number of pulses in its two inputs. That voltage is sent to amplifier 3 and in turn to converter 4 which converts voltage to pulses and a shaft rotation. The voltage, pulses, and shaft rotation are tied together electrically or mechanically so that the shaft rotation is precisely proportional to the pulse output of converter 4. The pulse output of converter 4 is fed back to comparator 1 where it is subtracted from the pulse input as previously discussed. If any difference exists, the comparator emits a voltage roughly proportional to the difference. The device therefore is self-correcting. The shaft rotation is made precisely proportional to the pulse input, not by generating a voltage which is infallibly proportional to said pulse input nor by synchronization of the pulse input to the shaft rotation, but by the comparison of a pulse output with a pulse input. This method results in improved accuracy since the device always deals with whole numbers.

Figure 2:
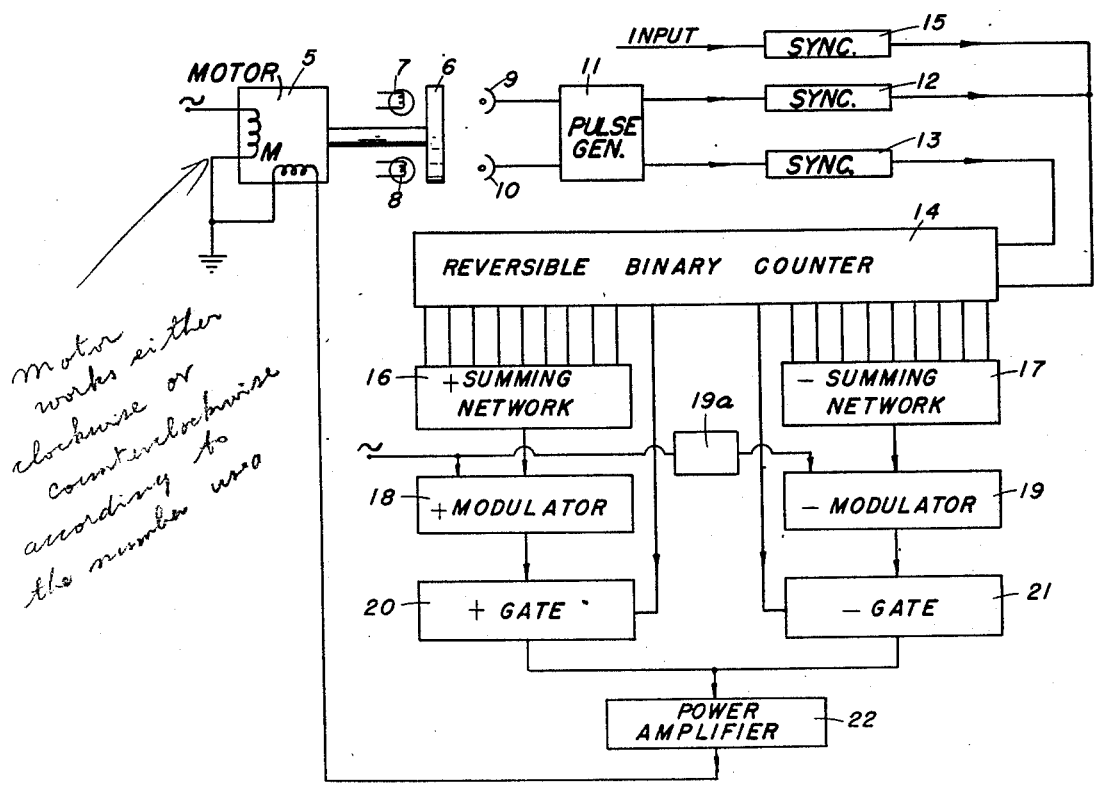
Fig. 2 is a block diagram of one particular embodiment of the device.

Turning now to Fig. 2 there is shown a particularized example of the general scheme shown in Fig. 1. Fig. 2 shows a two-phase motor 5 driving a slotted disc 6 which is shown in detail in Fig. 4. Light sources 7 and 8 are sensed through holes in the disc by photo-electric cells which drive a direction sensitive pulse generator 11. This generator in turn feeds synchronizers 12 and 13 which in turn drive reversible binary counter 14. The whole number to be converted into a shaft rotation is furnished in terms of a pulse input to the device through synchronizer 15 to the binary counter. Binary counter 14 produces a voltage proportional to the number stored therein by means of summing networks 16 and 17 which are connected to drive modulators 18 and 19 also provided with alternating currents which are mutually 180 degrees out of phase by means of phase shifter 19a. Gates 20 and 21 communicate to power amplifier 22 which in turn drives two-phase motor 5.

In operation a pulse input consisting of a number of electrical pulses is fed to synchronizer 15. This pulse input is counted by reversible binary counter 14 more particularly shown in Fig. 7. This counter consists of a series of bistable multivibrators coupled by gate circuits. The binary counter is reversible in that it may count either positive or negative numbers corresponding to either a clockwise or a counter-clockwise shaft rotation and the last bistable multivibrator in the counter is used to determine whether the counter is operating with a negative binary number or a positive binary number. If a positive number is stored in the counter, the positive gate 20 is opened allowing constant frequency alternating current of the phase furnished by modulator 18 to pass to amplifier 22 and in turn to motor 5. However, if the number stored in the counter is negative, a constant frequency alternating current 180 degrees out of phase with the foregoing current is allowed to pass through gate 21 and power amplifier 22 to motor 5 turning it in the opposite direction. Thus, whatever number is stored in the counter is used to generate a voltage which in turn modulates the constant frequency alternating current in amplitude and drives the two phase motor in the sense required to produce a rotation of the disc proportional to the number of input pulses and ultimately to produce a number of pulses equal to the number of input pulses.

Figure 4:
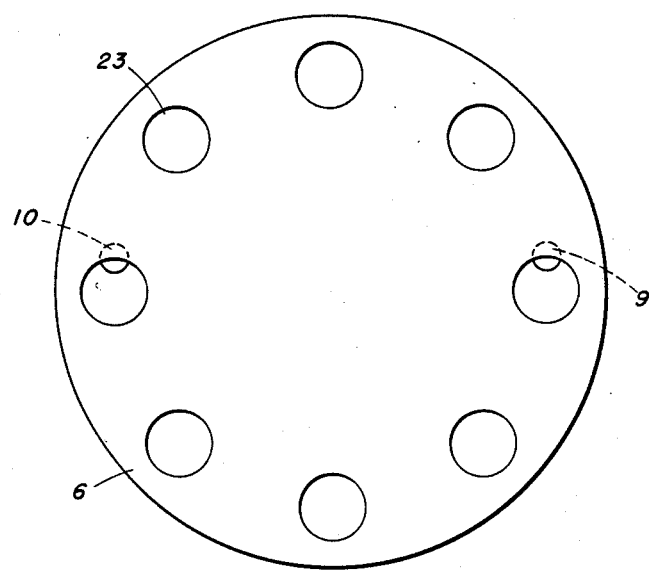
Fig. 4 through Fig. 8 are detailed circuit diagrams of components of this invention.

Referring now to Fig. 4, chopper disc 6 is shown in detail with photocells 9 and 10 and holes 23 in the chopper disc. If disc 6 is rotated in a clockwise direction in Fig. 4 it can be seen that photocell 9 will change from light to dark when photocell 10 is illuminated, and if the disc is rotated in a counter-clockwise direction the cell will change from dark to light when photocell 10 is illuminated. This expedient of offsetting the photocells from the axis of symmetry of the disc provides a convenient means of sensing the direction of rotation of the disc and hence of the motor.

Figure 5:
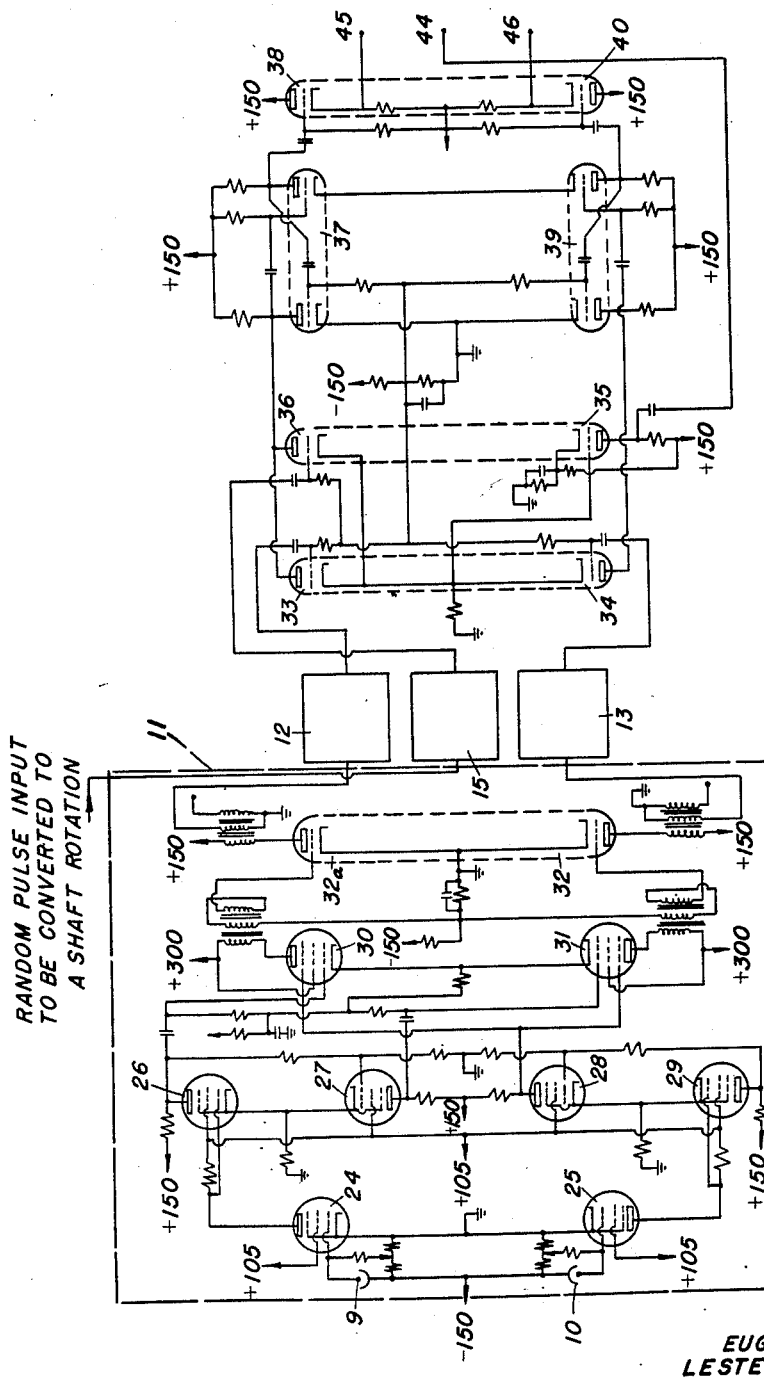

Turning now to Fig. 5 there is shown a detailed circuit diagram of direction sensitive pulse generator 11 which produces pulses originating from the slotted disc. In Fig. 5 photocells 9 and 10 are coupled to vacuum tubes 24 and 25 which in turn drive direct current coupled multivibrators comprising pentodes 26, 27, 28 and 29. Pentodes 30 and 31 are normally non-conducting coincidence and trigger tubes coupled to the plates of tubes 26, 27, 28 and 29. Pentodes 30 and 31 are transformers coupled to pulse amplifiers 32 and 32a which in turn connect to add synchronizer 12 and subtract synchronizer 13 shown schematically in Fig. 2 and in detail in Fig. 6. Add and subtract synchronizers 12 and 13 respectively are connected to trigger tubes 33 and 34 and to amplifier 35 through a common cathode resistor, while synchronizer 15 feeds trigger tube 36. Triodes 33 and 36 are connected to one-shot multivibrator 37 and cathode follower 38, whereas triodes 34 and 35 are connected to one-shot multivibrator 39 and cathode follower 40.

Assuming for the moment a clockwise rotation of the disc, and light on phototube 10 (which opens gating pentodes 30 and 31), transitions from light to dark will be produced on photo tube 9 and will cause a sudden rise in plate voltage on pentode 26 which in turn will place a positive pulse on pentode 30. Pentode 30 then conducts, triggering pulse amplifier 32a and furnishing clockwise or adding pulses to add synchronizer 12. For counter-clockwise rotation phototube 10 is illuminated only when transitions on phototube 9 are from dark to light. These transitions cause a sudden rise in plate potential of pentode 27, producing a positive pulse on the grid of pentode 31. Since pentode 31 is operative, it will conduct and trigger pulse amplifier 32, furnishing a counter-clockwise or subtracting pulse to subtract synchronizer 13.

The operations of synchronizers 12, 13 and 15 will be more completely discussed in a subsequent paragraph.

A pulse output from add pulse synchronizer 12 or pulse generator synchronizer 15 operates trigger tube 33 or 36 respectively as well as amplifier 35. The pulse from tube 33 or 36 will trigger one-shot multivibrator 37 and deliver an add gate pulse to reversible binary counter 14 from cathode follower 38. Simultaneously a counter pulse is sent to counter 14 from amplifier 35 so that the number stored in the counter will be increased by one. In a similar manner a pulse output from the subtract synchronizer 13 will energize the subtract gate of counter 14 so that the number stored in the counter will be decreased by one.

Since the output of direction sensitive pulse generator 11 and the input pulse which is to be converted to a shaft rotation may occur at random intervals it is necessary to synchronize these pulses to prevent their simultaneous arrival at counter 14. This function is performed by synchronizers 12, 13 and 15, more completely described in patent application Serial No. 115,340, entitled, "Random Pulse Synchronizer," and filed September 13, 1949, in the name of Walter Hochwald.

Figure 6:
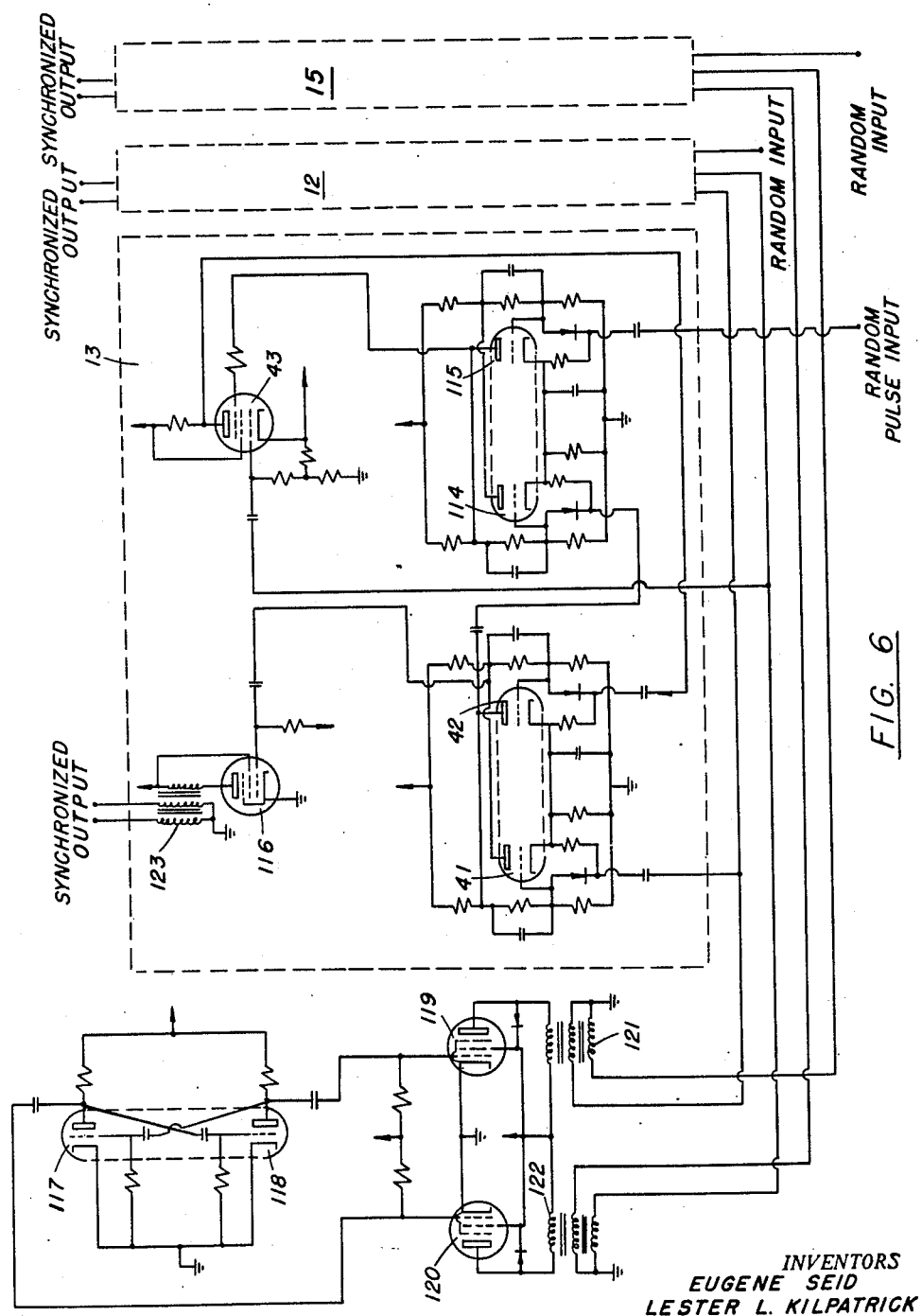

Referring to Fig. 6 there is shown a partially detailed blocked diagram of synchronizers 12, 13 and 15. Synchronizer 13 is shown in detail and comprises triodes 41 and 42 connected together as a bistable multivibrator, triodes 114 and 115 also connected together as a bistable multivibrator, and gate tube 43. Output pentode 116 is driven from the plate of triode 41. Triodes 117 and 118 form a free running multivibrator which feeds pulses to pentodes 119 and 120. Pentodes 119 and 120 are connected to pulse transformers 121 and 122 whose outputs are connected as shown to the bistable multivibrators in the various synchronizers.

The purpose of the synchronizers is to assure that the random input pulses furnished by synchronizer 15 never coincide with pulses furnished from direction sensitive pulse generator 11 through synchronizers 12 and 13 to counter 14. The free running multivibrator, which is comprised of triodes 117 and 118, emits a constant frequency pulse which has a frequency at least double the maximum frequency of the random pulse input to synchronizer 15. From Fig. 6 it can be seen that when the plate of triode 117 goes positive the plate of triode 118 goes negative; consequently the pulses appearing on the plates of triodes 117 and 118 are always 180 degrees out of phase. The pulses from the plate of triode 118 are fed to the control grid of pentode 119, and the pulses from triode 117 are fed to the control grid of pentode 120. The plates of pentodes 119 and 120 are connected by diodes to their respective suppressor grids as shown; consequently the two pentodes furnish pulses to pulse amplifiers 121 and 122 which are always 180 degrees out of phase. If the pulse output from pentode 119 is denoted the clock pulse, or simply C. P., and if the pulse output of pentode 120 is denoted the clock pulse ½, or simply C. P. ½, it can be seen that the two pulse outputs could, by their very nature, never coincide. By use of a dual output winding in each of the pulse transformers 121 and 122 it is possible to obtain both a positive and a negative pulse output from each of these transformers, which we shall denote plus C. P., minus C. P., plus C. P. ½ and minus C. P. ½. These constant frequency clock pulses are furnished to the three synchronizers by the connections as shown in Fig. 6. In operation, a random pulse input is furnished to the grid of triode 115 which, it is assumed, was in condition to conduct before the application of the random pulse, and therefore yields a pulse to gating pentode 43 which then opens, allowing the next plus C. P. ½ pulse to pass through the tube. The pulse from gate 43 then is applied to the grid of triode 42 which is in condition to conduct and does conduct a pulse to the grid of triode 114, which, however, has no effect since triode 114 is obviously conducting. The application of the pulse from gate 43 to triode 42 sets the bistable multivibrator comprising triodes 41 and 42, and puts triode 41 in condition to conduct. Therefore, the next minus C. P. pulse which is applied to the grid of triode 41 is conducted to the grid of output triode 116 and an output pulse is furnished from pulse transformer 123, which output pulse is synchronized with the clock pulses from triode 119. The bistable multivibrator of which triode 41 and 42 and 114 and 115 are a part are thus reset and are again in the condition initially assumed, and the next random pulse input will repeat the cycle just described. The random pulses furnished to synchronizer 13 are therefore synchronized with the clock pulses. In a similar manner, with the connections as shown in Fig. 6, synchronizers 12 and 15 synchronize their respective input pulses with the C. P. pulses and C. P. ½ pulses, respectively. Since the C. P. pulses are always 180 degrees out of phase with the C. P. ½ pulses the random pulse input to the device shown in Fig. 2 can never coincide with the pulses generated by direction sensitive pulse generator 11. Likewise, although synchronizers 12 and 13 synchronize their input pulses with the same C. P. pulses they can never coincide in arrival at counter 14 because disc 6 can only rotate in one direction at a time, and hence direction sensitive pulse generator 11 can deliver pulses only to one of synchronizers 12 and 13 at a time.

In order to synchronize a larger number of random pulse inputs it can be seen from Fig. 6 that it would be possible to devise a set of synchronizers whose output would be synchronized to constant frequency pulses 60 or 90, or some other convenient sub-multiple of 360 degrees out of phase with each other. In this connection it would be required to furnish not only C. P. and C. P. ½ pulses, but possibly C. P. ⅓ and C. P. ⅔ pulses in order to accommodate the greater variety of random pulse inputs. It must be borne in mind that the C. P. and C. P. ½ pulses in the device shown in Fig. 6 must be at least double in frequency over the maximum anticipated random pulse input frequency in order that the bistable multivibrators may always be re-cycled or reset before the arrival of the next random input pulse.

Figure 7:
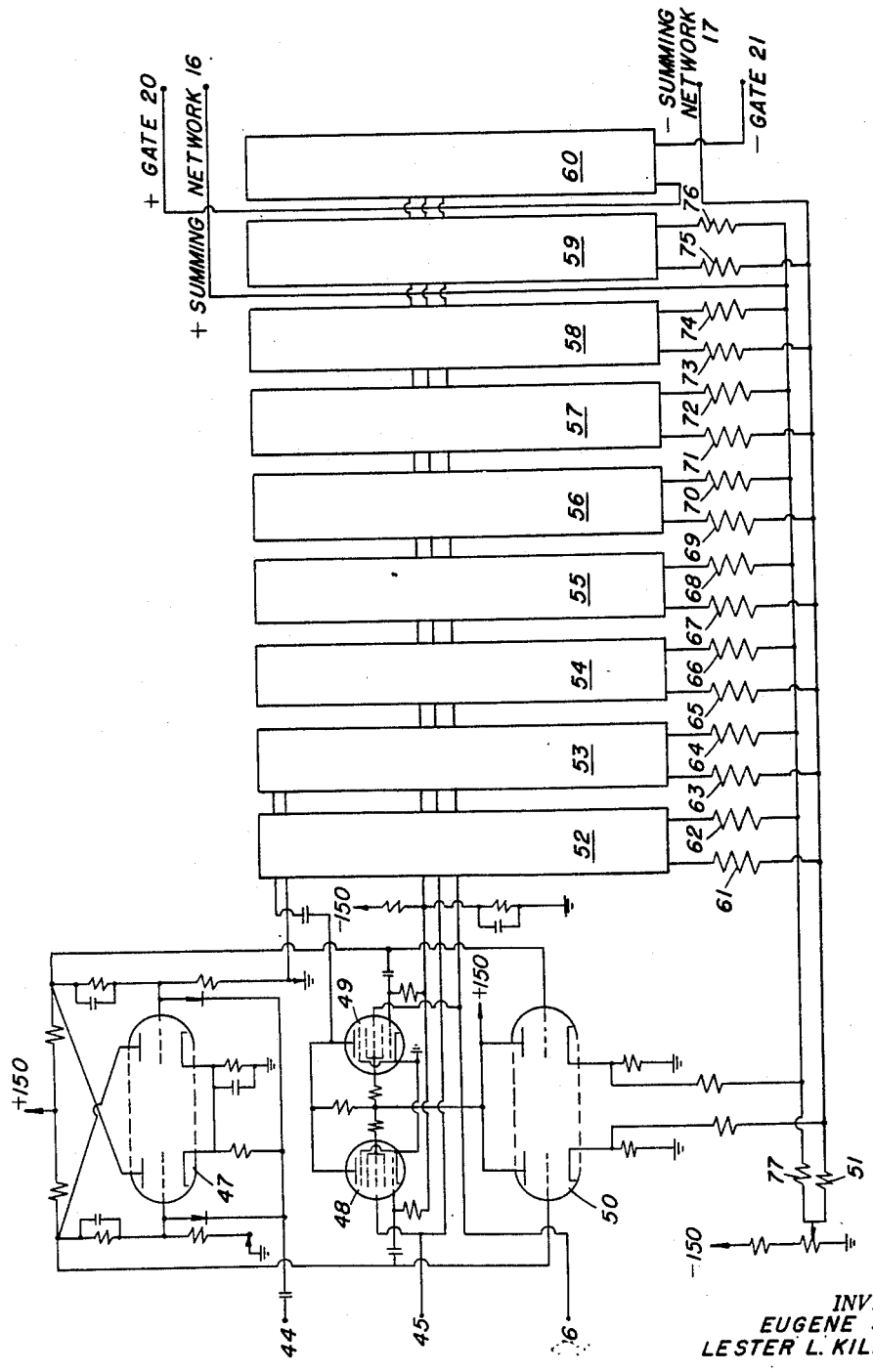

Referring now to Fig. 7 there is shown a partly detailed block diagram of reversible binary counter 14 which consists of a series of identical bistable multivibrators coupled by pentagrid gate tubes. Terminals 44, 45 and 46 in Fig. 7 are connected to terminals 44, 45 and 46 in Fig. 5. Double triode 47 is a part of the bistable multivibrator for the first stage of the counter, while pentagrids 48 and 49 serve as the add and subtract gates respectively to the subsequent stages. Double triode 50 is a double cathode follower provided to avoid overloading by the summing resistors to be hereinafter discussed. Nine identical stages, in addition to the one shown in detail in Fig. 7, make up the entire binary counter. Assuming that for a zero indication the left hand half of double triode 47 is on and that all tubes situated similarly to double triode 47 in the other nine stages are likewise on, then for binary addition a carryover pulse must occur when the right hand tubes of all the bistable multivibrators change from on to off. As a corollary, the counter will subtract if the carryover occurs when the right hand tubes change from off to on.

The adding or subtracting pulses from the pulse generator as shown in Fig. 5 trigger respectively the add or subtract gate multivibrators 37 and 39. For example, if an adding pulse occurs, add multivibrator 37 provides a positive gate on the suppressor grids of pentagrid 48 and all gate tubes similarly situated in the other nine stages of the counter, allowing them to conduct when an add carryover pulse appears on their control grids. Likewise, for a subtractive pulse, only those tubes corresponding to pentagrid 49 in the various stages are operative and only subtractive carryovers are effective in triggering each bistable multivibrator stage. Sufficient time must be allowed for all carryovers to take place throughout the ten stages. This necessitates a gate width of approximately three microseconds for a ten stage counter, this value being variable with the capacity of the counter.

Referring momentarily to Fig. 2, summing networks 16 and 17 are provided for the purpose of obtaining a voltage proportional to the number stored in counter 14. This voltage is obtained by connecting resistors from one plate of each bistable multivibrator through cathode followers to a common summing resistor 51. The current flow contributed by each of said resistors to resistor 51 is proportional to the voltage on said plates. Also, the voltage drop across resistor 51 is proportional to the current flow. If then the magnitude of each resistor is made inversely proportional to the value of the binary digit represented by the bistable multivibrator to which it is connected, the voltage drop across resistor 51 will be proportional to the binary number stored in the counter. In Fig. 7 stages 52, 53, 54, 55, 56, 57, 58, 59 and 60 have summing resistors having values in ohms approximating those shown in the following table:

| | |
|---|---|
| 61—10 M | 69—220 K |
| 62—10 M | 70—220 K |
| 63—5.1 M | 71—120 K |
| 64—5.1 M | 72—120 K |
| 65—2.4 M | 73—62 K |
| 66—2.4 M | 74—62 K |
| 67—560 K | 75—31 K |
| 68—560 K | 76—31 K |

To obtain proper sensing operation it is necessary that the counter have at least twice the storage capacity of the maximum number to be stored. If this is true, then the only case in which the last stage of the counter will change state is that indicating that a negative number is stored in the counter. This last stage is used to select either the positive or negative summing circuit corresponding to summing resistors 51 or 77, depending upon the sign of the stored number.

Figure 8:
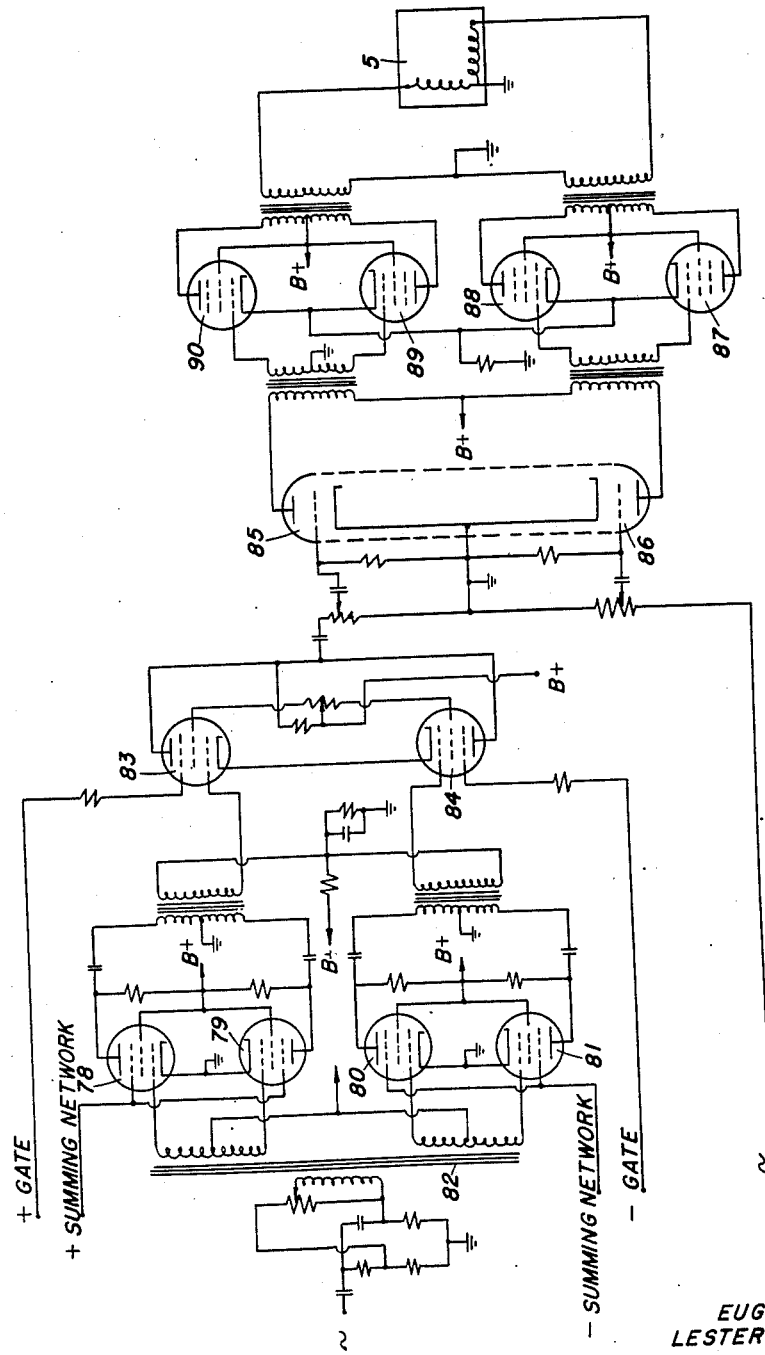

A schematic of modulators 18 and 19, gates 20 and 21, and power amplifier 22 is shown in Fig. 8. The direct current voltage from the positive and negative summing circuits is applied to the suppressor grids of tubes 78, 79, 80 and 81 respectively. The primary of transformer 82 is fed through a 90 degree phase shifting network from a constant frequency alternating current line. The grids of tubes 78 and 79 are driven at plus 90 degrees while the grids of tubes 80 and 81 are driven at minus 90 degrees. The alternating current signals from the positive and negative modulators are applied to the grids of gate tubes 83 and 84 respectively. The last bistable multivibrator of the reversible counter gates on either tube 83 or tube 84 depending upon whether the stored number is positive or negative. The grid of triode amplifier 85 is excited by an alternating current signal of plus 90 degrees on positive stored numbers and minus 90 degrees for negative stored numbers. A constant amplitude alternating current signal of zero degrees phase is used to drive amplifier 86. The output of this amplifier drives push-pull power amplifiers 87, 88, 89 and 90 which operate motor 5 in the proper direction to count down the numbers stored in the reversible counter.

Figure 3:
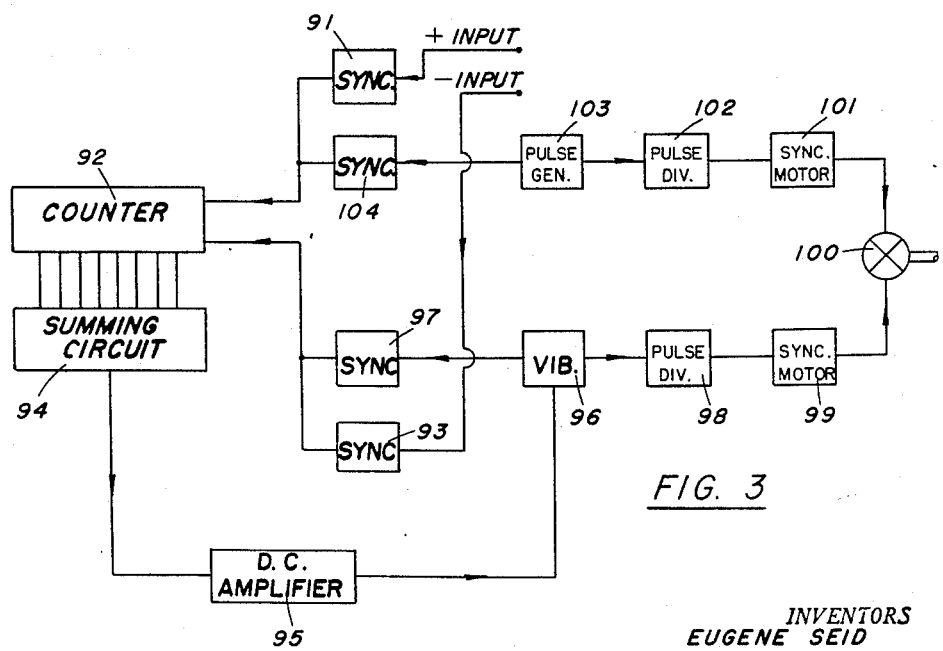
Fig. 3 is a block diagram of the second embodiment of the invention.

Referring to Fig. 3 there is shown a second embodiment of the device shown in Fig. 1. This device, like those previously discussed, has for its purpose the transformation of a pulse input into a precise shaft rotation output. Add pulses are fed to synchronizer 91 and thence to counter 92 which also receives subtract pulses via synchronizer 93 and produces a voltage proportional to the number stored therein by means of summing circuit 94. This voltage is amplified in direct current amplifier 95 and is used to drive a variable frequency multivibrator 96, which in turn feeds synchronizer 97 and pulse divider 98 which drives synchronous motor 99 connected mechanically to differential 100. Differential 100 is also driven by synchronous motor 101 energized by pulse divider 102 connected to a standard frequency pulse generator 103 which also feeds synchronizer 104.

Standard frequency pulses are generated by standard frequency pulse generator 103 and are fed to reversible counter 92 via synchronizer 104, which synchronizes the standard frequency from the standard frequency pulse generator with the add pulse input fed through synchronizer 91. In a similar manner, variable frequency pulses from variable frequency multivibrator 96 are fed to reversible counter 92 after synchronization with the subtract pulse input by means of synchronizers 97 and 93 respectively. If standard frequency pulse generator 103 and variable frequency multivibrator 96 are emitting pulses at precisely the same frequency and if no add or subtract pulses are being fed to synchronizers 91 or 93 respectively, reversible counter 92 will receive precisely the same number of add pulses as subtract pulses during any given interval of time, and the net number of pulses counted will be zero. Consequently no net increase or decrease of voltage generated by summing circuit 94, which is biased about its mid-range, will be produced. Furthermore, pulse dividers 98 and 102 will emit pulses at a constant frequency and synchronous motors 99 and 101 will be driven at exactly the same speed, resulting in zero shaft output of differential 100.

However, if variable frequency multivibrator 96 is not perfectly tuned with respect to standard frequency pulse generator 103, and assuming that variable frequency multivibrator 96 is generating pulses at a slightly lower rate than standard pulse generator 103, the reversible counter will commence storing up a positive number and summing circuit 94 will generate a voltage proportional thereto. This voltage is amplified in amplifier 95 and fed to variable frequency multivibrator 96 which responds by increasing its frequency. This process continues until variable frequency multivibrator 96 has produced a number of pulses exactly equal to the number of pulses produced by standard frequency pulse generator 103.

If add pulses are fed through synchronizer 91 to reversible counter 92, reversible counter 92 cannot distinguish between pulses externally furnished through synchronizer 91 and pulses furnished by standard frequency pulse generator 103 via synchronizer 104. Consequently it will generate a voltage similar to that generated when variable frequency multivibrator 96 was emitting pulses at a slower rate than standard frequency pulse generator 103 and there were no external pulses being furnished. Variable frequency multivibrator 96 will then be driven at a frequency which is the sum of the frequency of standard frequency pulse generator 103 and the frequency of the add pulse input to synchronizer 91. Likewise, synchronous motor 99 indirectly connected to variable frequency multivibrator 96 will drive one side of differential 100 at a speed such that its angular displacement is greater than that of synchronous motor 101 by an amount proportional to the number of add pulses furnished to synchronizer 91. The shaft output of differential 100 will therefore be proportional to the number of pulses furnished to synchronizer 91. If both add and subtract pulses are being furnished to synchronizers 91 and 93 respectively the operation of the device is no different than that hereinbefore discussed, except that the shaft output of differential 100 is proportional to the algebraic sum of the add and subtract input pulses.

Figure 9:
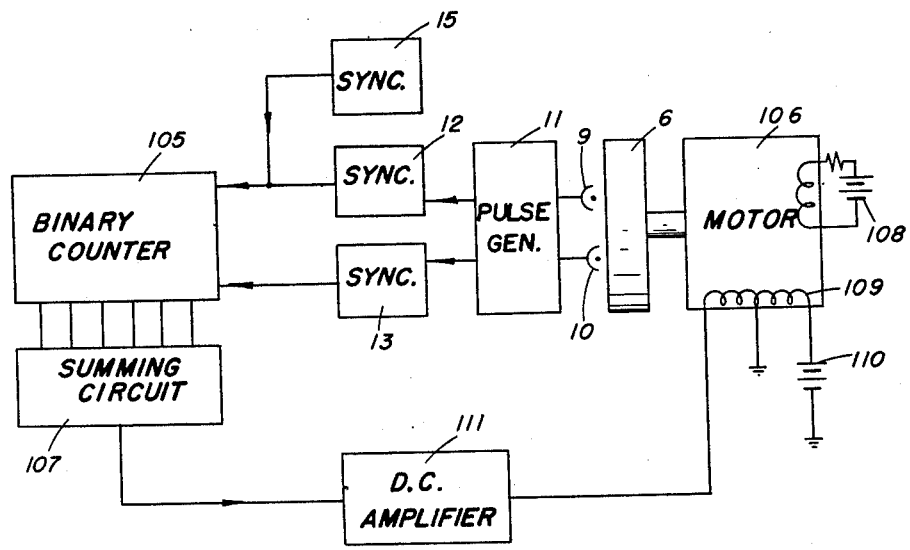
Fig. 9 is a block diagram of a third embodiment of the invention.

Referring to Fig. 9 there is shown a simplified embodiment of the device shown in Fig. 2. Direction sensitive pulse generator 11, photocells 9 and 10, and slotted disc 6 are as shown in Fig. 2. However, motor 5 of Fig. 2 is replaced by motor 106 in Fig. 9, and reversible binary counter 14 of Fig. 2 is replaced by binary counter 105 in Fig. 9. In addition, the summing circuits 15 and 17 of Fig. 2 are replaced by summing circuit 107 in Fig.

9. Synchronizers 12, 13 and 15 are identical with the corresponding synchronizers shown in Fig. 2. Motor 106 is a small D. C. motor which responds to very small signals of the order of a few milliamperes by means of windings shown schematically in Fig. 9. The armature of the motor is connected through an external resistance of the order of 28 ohms to a source of direct current shown typically as battery 108 in Fig. 9. The field winding 109 is split, and half of it is fed by battery 110 or other source of constant direct current, and the other half by a signal derived indirectly from the voltage emitted from summing circuit 107. A direct current amplifier 111 is interposed between summing circuit 107 and motor 106. In addition, any suitable damping circuit may be incorporated into D. C. amplifier 111 in accordance with whatever type damping may be desired.

Figure 10:
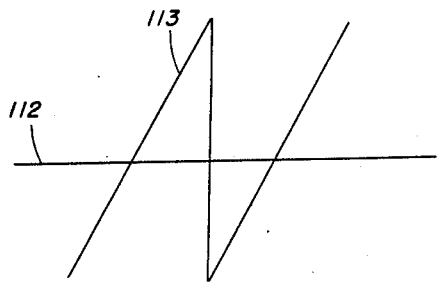
Fig. 10 is a graph of the output of a summing circuit of the device plotted against time.

The device shown in Fig. 9 functions in a similar manner to that shown in Fig. 2. However, instead of employing a separate summing network for positive and negative numbers stored in the binary counter, a single summing network 107 is used, which network is effectively biased about its mid-point so that its lowest voltage corresponds to the largest negative number attainable by the counter, and its highest positive voltage corresponds to the highest positive number which may be stored by the counter. This voltage is represented by the graph of Fig. 10 where the horizontal line at 112 corresponds to zero on the counter. In Fig. 10, if a constant frequency pulse were continuously supplied to the counter a voltage corresponding to the curve 113 would be generated by the summing circuit with the voltage increasing progressively until the counter completely exhausted its capacity, at which time the voltage would again return to its minimal value.

In operation, a number of input pulses from an external source is supplied to synchronizer 15 and thence to the counter. Counter 105 records this number of pulses and produces by means of summing circuit 107 a voltage proportional thereto. This voltage is amplified in D. C. amplifier 111 and is fed through the left half of winding 109 to ground as shown in Fig. 9. The potential of battery 110 is chosen to correspond to the summing circuit voltage at line 112 in Fig. 10. The motor therefore does not turn if the voltage supplied through the left-hand side of winding 109 is equal to that supplied to the right-hand half thereof by battery 110. This condition corresponds to a zero count by counter 105, the armature of motor 106 being energized by battery 108. The angular displacement of motor 106 is detected by means of slotted disc 6, photocells 9 and 10, and direction sensitive pulse generator 11 in precisely the same manner as disclosed in connection with the device shown in Fig. 2. Also, the operation of synchronizers 12, 13 and 15, by which coincidence of the externally supplied input pulses with pulses furnished by pulse generator 11 is avoided, is the same as hereinbefore disclosed. The primary advantage of this embodiment is that the part of the servo loop between the counter and the motor is materially shortened, and provision may be readily made in connection with D. C. amplifier 111 for introducing appropriate damping.

There is thus provided a servo system whose precision is considerably greater than devices heretofore known because it deals with the measured variable in digital form.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for producing a shaft rotation proportional to a whole number of electrical pulses comprising means for producing a number of electrical pulses precisely proportional to said shaft rotation, means for producing a voltage proportional to the difference between said whole number of electrical pulses and said number of electrical pulses proportional to said shaft rotation, converter means for producing a shaft rotation at least roughly proportional to said voltage whereby said shaft rotation is made proportional to said whole number of pulses.

2. Means for producing a rotation proportional to any digit comprising means for producing a number of consecutive electrical pulses equal to said digit, an electronic counter for summing said pulses and any other pulses furnished thereto, means for producing a voltage proportional to the number stored in said electronic counter, an electric motor adapted to be driven at a speed proportional to said voltage, a slotted disc adapted to be turned by said motor, photocell means for producing a number of electrical pulses proportional to the angular displacement of said slotted disc, and means for furnishing said last-named pulses to said counter in the sense and sequence required to reduce the number of pulses stored therein whereby the rotation of said motor is made proportional to said digit.

3. Means for rotating a shaft through an angle corresponding to a predetermined whole number comprising an electric motor for rotating said shaft, means attached to said shaft for producing a number of electrical pulses proportional to the angle traversed by said shaft, means for producing a number of electrical pulses equal to said whole number, and comparator means with its output connected to said electric motor for producing a voltage proportional to the difference between said two numbers of electrical pulses to thereby drive said motor an angular distance proportional to said whole number.

4. A device as recited in claim 3 in which said comparator means comprises a reversible binary electronic counter and a series of resistors connected to the plates of the tubes in the various stages thereof having values inversely proportional to the value of the binary digit represented thereby so as to produce a voltage proportional to the number stored therein.

5. Means for rotating a shaft through an angle corresponding to a predetermined whole number comprising an electric motor whose speed is a function of the voltage furnished to it for rotating said shaft, means attached to said shaft for producing a number of electrical pulses proportional to the angular distance traveled thereby, means for producing a number of electrical pulses equal to said whole number, a reversible binary electronic counter for continuously recording the difference between said two numbers in binary form, a plurality of summing resistors connected from the plates of the tubes in each stage of said counter to two common resistors, and having values inversely proportional to the binary digit represented by the stage in the counter to the plate of the tube of which each resistor is connected so as to produce a voltage across said common resistors proportional to the binary number stored in the counter, and means for amplifying said voltage, said last-named means being connected to drive said motor to thereby rotate said shaft an angular distance proportional to said whole number.

6. A device as recited in claim 5 in which said means attached to said shaft for producing a number of electrical pulses proportional to the angular distance traversed thereby comprises a circular disc attached to rotate with said shaft and having an even number of equally spaced holes, two photocells rigidly mounted adjacent said disc, a light source so placed with respect to said disc and said photocells as to shed light intermittently on said photocells through the holes in said disc to thereby produce a number of electrical pulses proportional to the rotation of said shaft.

7. A device as recited in claim 5 in which said means attached to said shaft for producing a number of electrical pulses proportional to the angular distance traversed thereby comprises a circular disc attached to rotate with said shaft and having an even number of equally spaced holes concentric with said shaft, two photocells rigidly mounted adjacent to said disc so as to receive light through said holes, and offset from a diameter of said disc, two pentagrid amplifiers connected to said photocells, two direct coupled multivibrators connected to said pentagrid amplifiers so that one of said multivibrators emits pulses from light transitions from light to dark on one of said photocells when the other of said photocells is illuminated and the other of said multivibrators emits pulses from light transitions from dark to light on said one photocell when said other photocell is illuminated to thereby produce a number of electrical pulses proportional to the distance traversed by said shaft and indicative of the direction of travel of said shaft.

8. Means for producing a number of pulses proportional to the rotation of a shaft comprising a circular plate attached to said shaft at its center and having an even number of holes equally spaced around a circle concentric with said plate, two photocells rigidly mounted adjacent said plate and on said concentric circle but not on a single diameter thereof, two parallel electrical circuits corresponding to the clockwise and counter-clockwise rotations of said shaft, a bistable multivibrator connectible to the output of one of said photocells, one gating electronic tube connected to the output of the plates of each of the tubes in said bistable multivibrator and biased to cutoff, electronic means for connecting the output of said one of said photocells to said bistable multivibrator whenever the other of said photocells is illustrated, whereby a number of pulses proportional to the rotation of said shaft is produced on one or the other of said gating tubes, depending on the direction of rotation of said shaft.

9. Means for producing a shaft rotation proportional to a whole number of electrical pulses comprising electromotive means for turning a shaft, means attached to said shaft for producing a number of electrical pulses proportional to the rotation of said shaft, a reversible binary electronic counter for continuously recording a binary number equal to the difference between said whole number of electrical pulses and said number of electrical pulses proportional to the rotation of said shaft, means for producing a voltage proportional to the binary number recorded in said counter, and means for driving said electromotive means in response to said voltage to thereby produce a shaft rotation proportional to said whole number of electrical pulses.

10. A device as recited in claim 9 and further comprising a plurality of pairs of bistable multivibrators connected to the input to said counter, generator means for furnishing to said bistable multivibrators two constant frequency trains of pulses with a frequency at least double the highest frequency of said whole number of electrical pulses, said trains of pulses being predeterminately out of phase with each other, said whole number of pulses and said number of pulses proportional to the rotation of said shaft being connected to one tube in each of the pairs of said multivibrators and said trains of pulses being connected to the other tubes in each of said pairs of mutlivibrators to thereby provide an input to said counter which is free of the coincidence of said whole number of pulses with said number of pulses proportional to the rotation of said shaft.

11. A device as recited in claim 9 in which said electromotive means comprises a two-phase motor and in which said driving means comprises a modulator for varying one of the phases of the electrical energy fed to said motor to thereby cause the speed of said motor to correspond to the magnitude of said voltage.

12. A device as recited in claim 9 in which said electromotive means comprises a direct current electrical motor and in which said driving means comprises a power amplifier whereby the speed of said motor corresponds to the magnitude of said voltage.

13. Servo means for monitoring an output to an electrical pulse input comprising means for producing a number of electrical pulses proportional to said output, electronic counter means for continuously counting the difference between said input pulses and said number of pulses, means for producing a voltage continuously proportional to said counted difference, and means for producing an output proportional to said voltage, to thereby monitor said output to said pulse input.

14. A device as recited in claim 13 in which said means for producing a number of electrical pulses proportional to said output comprises a perforated disc rotated in proportion to said output, a light source for illuminating said perforations, and photocell means for producing a number of electrical pulses proportional to the number of said perforations which pass said light source.

15. A device as recited in claim 13 in which said electronic counter means for continuously counting the difference between said input pulses and said number of pulses comprises a reversible binary digital electronic counter, and means for feeding said input pulses and said number of pulses to said counter without coincidence.

16. A device as recited in claim 13 in which said means for producing a voltage continuously proportional to said counted difference comprises two common resistors connected to a negative plate supply, a plurality of resistors connected between the plates of each tube to one of said two common resistors, said plurality of resistors having values inversely proportional to the binary digit represented by the counter stage to the plate of a tube in which the resistor is attached so as to provide voltage across said common resistors proportional to the number stored in said counter, one common resistor reflecting a positive number and the other a negative number stored in said counter.

17. A device as recited in claim 13 in which said means for producing a number of electrical pulses proportional to said output comprises a standard frequency pulse generator, a variable frequency pulse generator, a synchronous motor adapted to be driven by each of said pulse generators, and a differential connected to be driven by said synchronous motors and to drive said output, and in which said means for producing an output proportional to said voltage comprises means for varying the frequency of said variable frequency pulse generator, and frequency divider means interposed between said pulse generators and said synchronous motors, whereby the shaft output of said differential is proportional to the algebraic sum of said pulse input and the difference between the pulse outputs of said pulse generators.

18. A device as recited in claim 13 in which said means for producing a number of electrical pulses proportional to said output comprises a standard frequency pulse generator, a variable frequency pulse generator, a synchronous motor adapted to be driven by each of said pulse generators, and a differential connected to be driven by said synchronous motors and to drive said output; said electronic counter means for continuously counting the difference between said input pulses and said number of pulses comprises a reversible digital electronic counter, means for feeding said input pulses and the pulses from said standard frequency pulse generator and from said variable frequency pulse generator to said counter without coincidence; and said means for producing an output proportional to said voltage comprises means for varying the frequency of said variable frequency pulse generator and frequency divider means interposed between said pulse generators and said synchronous motors, whereby the shaft output of said differential is proportional to the algebraic sum of said pulse input and the difference between the pulse outputs of said pulse generators.

19. Servo means for monitoring an output to an electrical pulse input comprising a perforated disc rotated in proportion to said output, a light source for illuminating said perforations, photocell means for producing a number of electrical pulses proportional to the number of said perforations which pass said light source, a reversible binary digital electronic counter having triode electronic tubes arranged in pairs, means for feeding said input pulses and said number of pulses to said counter without coincidence, two common resistors connected to the common cathode return of said triodes, a plurality of resistors connected between the plates of each tube to one of said two common resistors, said plurality of resistors having values inversely proportional to the binary digit represented by the counter stage to the plate of a tube in which the resistor is attached so as to provide voltage across said common resistors proportional to the number stored in said counter, one common resistor reflecting a positive number and the other a negative number stored in said counter, a two-phase motor for producing said output in rotational form, modulator means sensitive to said voltage for producing an alternating current signal whose phase corresponds to said voltage, and amplifying means for driving said motor in response to said signal, to thereby monitor said output to said pulse input.

20. Servo means for monitoring an output to an electrical pulse input comprising a standard frequency pulse generator, a variable frequency pulse generator, two synchronous motors adapted to be driven by each of said pulse generators, a differential connected to be driven by said synchronous motors and to drive said output, a reversible digital electronic counter, means for feeding said input pulses and the pulses from said standard frequency pulse generator and from said variable frequency pulse generator to said counter without coincidence, two common resistors connected to a negative plate supply, a plurality of resistors connected between the plates of each tube to one of said two common resistors, said plurality of resistors having values inversely proportional to the binary digit represented by the counter stage to the plate of a tube in which the resistor is attached so as to provide a voltage across said common resistors proportional to the number stored in said counter, one common resistor reflecting a positive number and the other a negative number stored in said counter, means for varying the frequency of said variable frequency pulse generator in response to said voltage, and frequency divider means interposed between said pulse generators and said synchronous motors whereby the shaft output of said differential is proportional to the algebraic sum of said pulse input and the difference between the pulse outputs of said pulse generators.

21. Means for accurately counting a plurality of trains of random frequency electrical pulses comprising a binary electronic counter, a pair of bistable multivibrators and a gating electronic tube for each of said trains of random frequency pulses, means for generating a plurality of constant equal frequency pulses mutually out of phase and at least double the maximum frequency of said random pulse trains, each of said trains of random frequency pulses being connected to set one bistable multivibrator in each pair, said gating tube being connected to open only when said first bistable multivibrators are set, one of said constant frequency pulses being connected to set each of said second bistable multivibrators via said gating tube, another of said constant frequency trains of pulses being connected to reset both said bistable multivibrators in each pair, and each of said second bistable multivibrators being connected to deliver output pulses to said binary counter whenever they are reset to thereby furnish a number of pulses to said binary counter which is equal to the sum of said random pulses but which pulses never coincide in arrival at said counter.

EUGENE SEID.
LESTER L. KILPATRICK.

REFERENCES CITED

The following references are of record in the file of this patent:

UNITED STATES PATENTS

| Number | Name | Date |
| --- | --- | --- |
| 1,818,963 | Tolson | Aug. 11, 1931 |
| 2,008,909 | Hershey | July 23, 1935 |
| 2,176,742 | La Pierre | Oct. 17, 1939 |
| 2,280,019 | Alexandersson et al. | Apr. 14, 1942 |

FOREIGN PATENTS

| Number | Country | Date |
| --- | --- | --- |
| 31,526 | Netherlands | Dec. 15, 1933 |